March 26, 1963  E. WIEGER  3,082,881
TELESCOPICALLY VARIABLE OVERHANG BEAM FOR
DREDGES, CRANES, AND THE LIKE
Filed April 18, 1961  3 Sheets-Sheet 1

INVENTOR.
Ernst Wieger
BY

March 26, 1963 E. WIEGER 3,082,881
TELESCOPICALLY VARIABLE OVERHANG BEAM FOR
DREDGES, CRANES, AND THE LIKE
Filed April 18, 1961 3 Sheets-Sheet 2

INVENTOR.
Ernst Wieger
BY

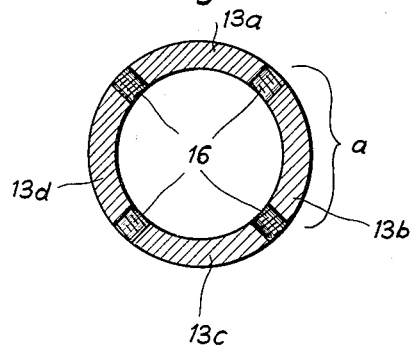
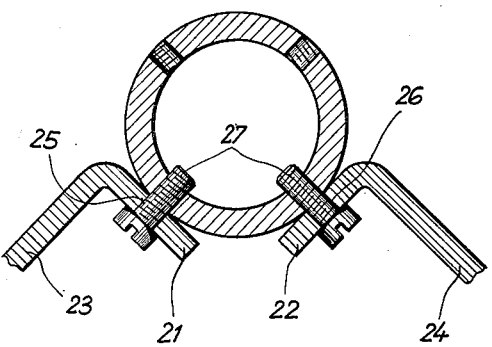
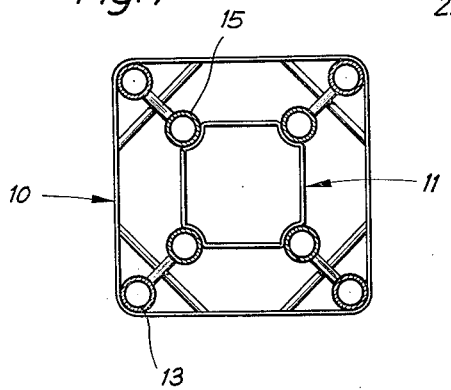

3,082,881
TELESCOPICALLY VARIABLE OVERHANG BEAM
FOR DREDGES, CRANES, AND THE LIKE
Ernst Wieger, Rheinallee 13, Dusseldorf, Germany
Filed Apr. 18, 1961, Ser. No. 103,918
Claims priority, application Germany Apr. 20, 1960
7 Claims. (Cl. 212—55)

The present invention relates to a telescopically extensible and contractible overhang beam for dredges, cranes, and the like. Dredges, cranes, or similar machinery for moving and transporting soil, gravel, stones, or the like have a rotatable chassis or carriage having mounted thereon a housing portion with one or more driving motors, which housing portion is equipped with an overhang beam or boom which is tiltable in a vertical plane. While one end of the overhang beam is tiltably journalled in the housing, the other end carries a roller over which pass cables or chains for moving the dredge scoops or dredge buckets. In many instances, the tiltability of the overhang beam in vertical direction is not sufficient to meet the various requirements. Therefore, the overhang beam has been designed of two parts while the two coaxial parts have been made telescopically displaceable relative to each other so that the entire overhang beam can be extended or shortened in conformity with the respective requirements. The two telescopic parts of such overhang beam consist of tubular frames having rollers interposed therebetween. The rollers rest on longitudinal bars of the tubular frame.

In contrast to rolling parts sliding or rolling on each other, as they are used in many fields of engineering, the roller engaged tracks or surfaces of the bars or frame pipes extending in longitudinal direction are subjected to an unduly great wear. This is due to the fact that a portion of the gravel or sand lifted and transported by the dredge or crane drops onto the track surfaces of the longitudinal pipes. In spite of great carefulness and endeavors it has been impossible to prevent the track surfaces of the longitudinal pipes from wearing out after an undue short time of operation.

Heretofore, the worn out track surfaces of the bars or pipes were repaired either by welding or the pipes had to be exchanged over their entire length.

It is, therefore, an object of the present invention to provide an overhang beam adapted to be extended and shortened for dredges, cranes, or the like which will overcome the above mentioned drawbacks.

It is another object of this invention to provide an overhang beam of the above mentioned general type which will avoid the expensive depositing welding as well as the exchange of pipes when the track surface over the width of a roller has worn out.

These and other objects and advantages of the invention will appear more clearly from the following specification in connection with the accompanying drawings, in which:

FIG. 5 is a cross section through a longitudinal pipe with threaded bores, in conformity with the invention.

FIG. 6 illustrates in section a further embodiment of the supporting surfaces for the transverse frame parts.

FIG. 7 is a cross section of a further embodiment of overhang beam parts according to the invention.

*General Arrangement*

Figure 1:
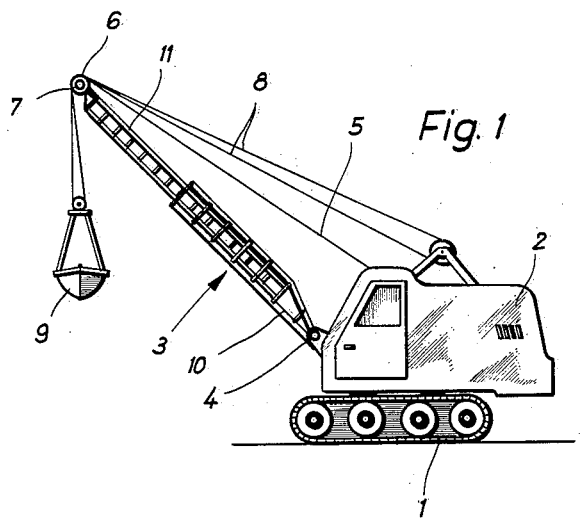
FIG. 1 illustrates a dredge having an overhang beam adapted to be extended and shortened, in conformity with which the present invention may be employed.

The present invention concerns an overhang beam or boom for dredges, cranes, or the like which is adapted telescopically to be extended or shortened and which has two bars or tubular frame members which are displaceable in each other while between said bars or tubular frames rollers are provided. The invention is characterized primarily in that those frame portions which extend in transverse direction of the overhang beam or boom form engaging surfaces for the bars or pipes extending in longitudinal direction. Said bars or pipes are rotatable about their longitudinal axes and are detachably connected to the engaging surfaces of the frame portions extending in transverse direction.

Preferably, the said engaging surfaces of the frame portions extending in transverse direction have a circular segment shaped cross section. The engaging surfaces of the transverse frame portions are provided with bores adapted to receive threaded bolts which are adapted to be screwed into correspondingly arranged threaded bores of the longitudinal bars or pipes. Preferably, the threaded bores are arranged on the circumference of the longitudinal bars or pipes and circumferentially spaced from each other by at least the width of the rollers.

If now a track surface of the longitudinal bars or pipes has worn out, the pipes are rotated about their longitudinal axes after the threaded bolts have been removed from the bores in the bars. After the bars have been rotated about their longitudinal axes, so that the running surface of the rollers now faces an unworn surface of the bars or pipes, the bars are again connected to the engaging surface or transverse frame parts by means of said threaded bolts. If, for instance, four threaded bores are provided at the same levels and distributed over the circumference of each longitudinal pipe, each pipe may be turned about its longitudinal axis by 90° four times until it is completely worn out.

*Structural Arrangement*

Referring now to the drawings in detail, the carriage 1 has mounted thereon the motor or engine housing 2 of a dredge which is equipped with an overhang beam or boom 3 adapted to be tilted in a vertical plane about a pivot 4. The tilting of beam 3 for elevating or lowering the end 6 is effected by a cable 5. The end 6 carries rollers 7 over which pass cables 8 for actuating the dredge scoops or buckets 9.

In order to vary the length of the overhang beam 3, the latter is composed of two sections 10 and 11 which are adapted telescopically to be displaced relative to each other. Section 10 is tiltably connected to the engine housing 2 whereas section 11 carries the rollers 7.

Figure 2:
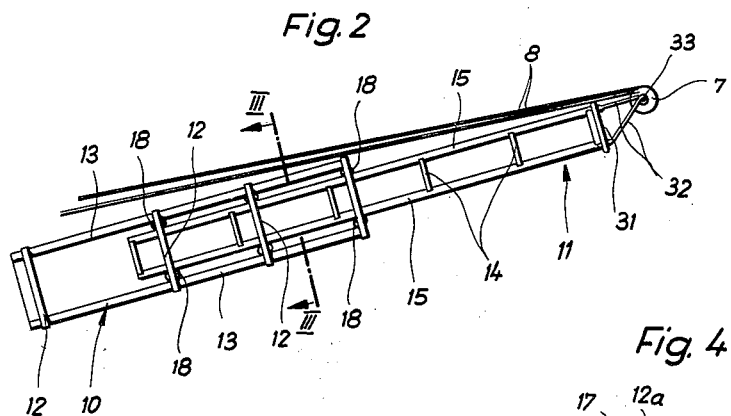
FIG. 2 illustrates on a larger scale than FIG. 1 two overhang beam sections according to the present invention which are adapted telescopically to be displaced relative to each other.
Figure 4:
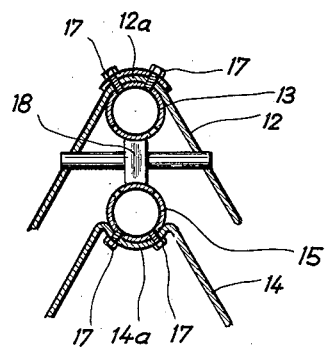
FIG. 4 illustrates on a larger scale than FIG. 3 the mounting of two longitudinal pipes according to FIG. 3.
Figure 3:
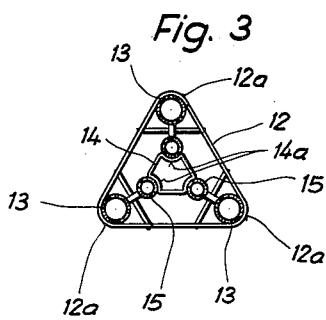
FIG. 3 is a section along the line III—III of FIG. 2.

The overhang beam section 10 is in conformity with the embodiment illustrated in FIGS. 2 to 4 composed of a plurality of triangular-shaped transverse frames 12 spaced from each other in longitudinal direction of said beam, and of pipes or bars 13 extending in longitudinal direction of said beam. Each of said frames 12 forms a triangle the corners 12a of which are rounded according to FIG. 3 in such a way that their inner surfaces form a contact surface for the pipes 13. The radius of curvature of the rounded portion 12a preferably corresponds to the curvature of the outer circumference of the pipes or bars 13.

The beam section 11 is likewise formed primarily by triangular frames 14 spaced from each other in longitudinal direction of the beam and by pipes or bars 15 extending in longitudinal direction of the beam. The corners of the triangular frames 14 are arched inwardly in such a way that they likewise form contacting or supporting surfaces 14a for the pipes 15. The pipes 13 and 15 are provided with threaded bores 16 (FIG. 5) circumferentially spaced from each other and also in longitudinal direction of said pipes. Preferably, groups of four circumferentially evenly spaced threaded bores are evenly distributed over the length of the pipes. The circumferential distance a from one threaded bore to the next threaded bore is selected greater than the width of the rollers (to be referred to later) between the beam section 10 and the beam section 11. The contacting or supporting surfaces 14a and the inner surface at the rounded portions 12a are provided with corresponding bores. Thus, threaded bolts 17 may be screwed through said bores of the above mentioned contacting or supporting surfaces into the threaded bores 16 by means of which the pipes 13, 15 will be held in their respective positions as will be clearly evident from FIG. 4.

Between the oppositely located bars or pipes 13, 15 of the inner and outer beam sections there are provided in a manner known per se rollers 18 which have a width less than the distance a between two circumferentially successive threaded bores 16 of the pipes 13, 15.

If the longitudinal section of a pipe or bar 13, 15 which is engaged by or forms a track for the rollers 18 is worn out, the bolts 17 are detached and the bars are rotated about their longitudinal axes and then again connected to their supports by the bolts 17. If, in conformity with the specific showing in the drawings (FIG. 5) there are provided four sections 13a, 13b, 13c, 13d between successive threaded bores, it will be obvious that the respective pipe may be rotated each time by 90°.

According to the arrangement shown in FIG. 6, the contacting surface for the pipes of the inner beam section is formed by rectangularly bent parts 21, 22 of struts 23, 24. Also in this instance, the supporting or contacting surfaces 21, 22 are provided with corresponding bores 25, 26 through which extend threaded bolts 27.

A further modification in the cross sectional shape of the two beam sections 10 and 11 is illustrated in FIG. 7. According to this embodiment, the beam sections 10, 11 have a square cross section. Also in this instance, the pipes 13, 15 are contacted by correspondingly rounded contact or supporting surfaces of the beam sections so that the pipes are rotatable and adjustable about their longitudinal axes in the manner described above.

It is, of course, to be understood that the present invention is, by no means, limited to the particular constructions shown in the drawings but also comprises any modifications within the scope of the appended claims.

Figure 2A:
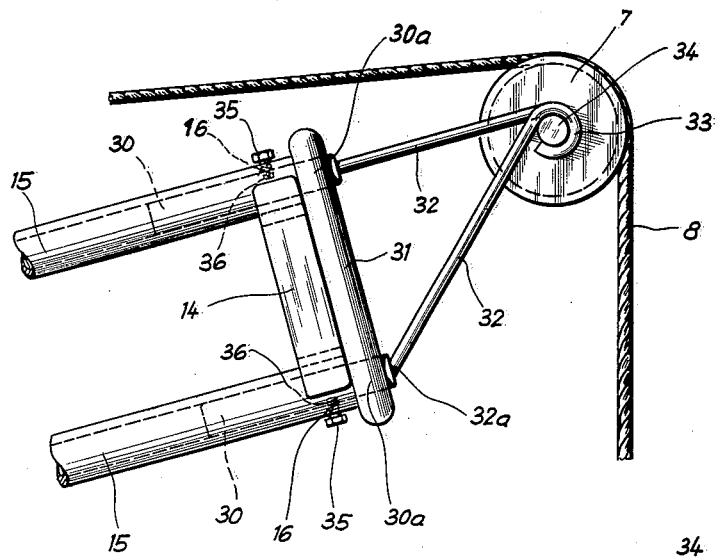
FIGS. 2a and 2b show details of the front end of the overhang beam.
Figure 2B:
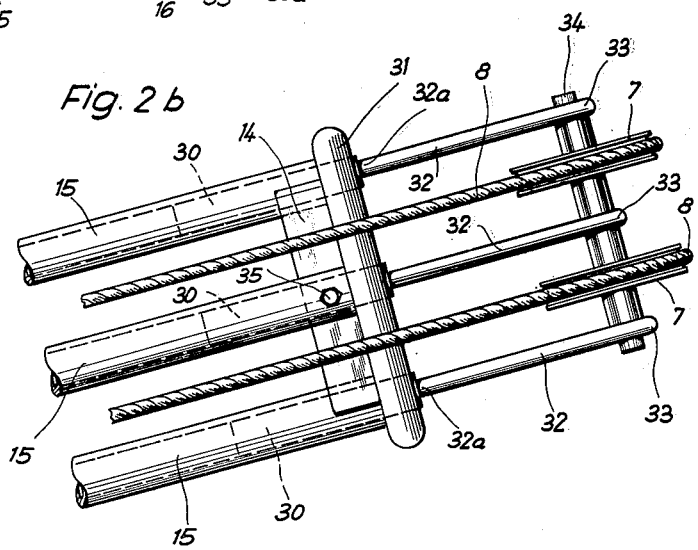

As can be seen from FIG. 2a and FIG. 2b, bolts 30 are inserted into the front end of the pipes or bars 15 of the section 11, which bolts are projecting out of the pipes 15 at 30a and interconnected there by means of a frame 31 which is located in parallel with the frames 14. The bolts 30 are carrying extensions 32, one or more of which being located in straight extension of the corresponding pipes 15, whereas the other extensions (in FIG. 2b shown as the two external ones) are slightly squared at 32a. The front ends of the extension 32, which may also be made as parts which are separate from the bolts, are provided with supporting lugs 33 which carry the shaft 34 on which are supported the pulleys 7 for the ropes 8. The pipes 15 may, thus, also be turned, if the pulleys 7 are located at the overhang beam. It will also be possible to remove that portion which carries the pulleys 7 by drawing the bolts 30 out of the pipes 15 and remove them together with the triangular frame 31 and the extensions 32.

If required, the pivots 30 can be secured by means of bolts 35 or the like which will be passed through the free bores 16 of the pipes 15, for which purpose the bolts 30 have been provided with corresponding bores. For turning the tubes 15, it is only necessary to loosen the bolts 35.

What I claim is:

1. A boom adapted selectively to be extended and shortened, especially for dredges, cranes and similar machinery, which includes: a first boom section, a second boom section telescopically extending into said first boom section for extension in a lateral direction, and roller means interposed between said first and second boom sections and engaging the same to permit telescopic movement of said boom sections relative to each other, each of said boom sections including cylindrical longitudinal frame members engaged by said roller means and extending in longitudinal direction of the respective boom section, each of said boom sections also including transverse polygonal frame members spaced from each other in longitudinal direction of the respective longitudinal frame members for supporting the same and formed at the corners for engaging the respective longitudinal frame members, each of said boom sections also including means detachably interconnecting said longitudinal and transverse frame members thereof to selectively permit disengagement of said transverse and longitudinal frame members from each other and turning each of the latter about the longitudinal axis thereof by a certain angle less than 180°, said longitudinal frame members being reconnectable in their respective turned position to the respective transverse frame members pertaining thereto.

2. A boom adapted selectively to be extended and shortened, especially for dredges, cranes and similar machinery, which includes: a first boom section, a second boom section telescopically extending into said first boom section, and roller means interposed between said first and second boom sections and engaging the same to permit telescopic movement of said boom sections relative to each other, each of said boom sections including cylindrical longitudinal frame members extending in longitudinal direction of the respective boom section and having portions engaged by said roller means, each of said boom sections also including transverse polygonal frame members spaced from each other in longitudinal direction of the respective longitudinal frame members and having contact sections at the corners corresponding in shape to the outer circumferential contour of the respective longitudinal frame members for engagement therewith, each of said boom sections also including means detachably interconnecting said longitudinal and transverse frame members thereof to selectively permit disengagement of said transverse and longitudinal frame members from each other and turning of each of the latter about its longitudinal axis by a certain angle less than 180°, said longitudinal frame members being reconnectable in their respective turned position to the respective transverse frame members pertaining thereto.

3. A boom adapted selectively to be extended and shortened, especially for dredges, cranes and similar machinery, which includes: a first boom section, a second boom section telescopically extending into said first boom section, roller means interposed between said first and second boom sections and engaging the same to permit telescopic movement of said boom sections relative to each other, each of said boom sections including cylindrical longitudinal frame members extending in longitudinal direction of the respective boom section and having portions engaged by said roller means, each of said boom sections also including transverse polygonal frame members spaced from each other in longitudinal direction of the respective longitudinal frame members and having contact sections at the corners corresponding in shape to the outer circumferential contour of the respective longitudinal frame members for engagement therewith, said contact sections being provided with bores, the said longitudinal frame members of each of said boom sections being provided with a plurality of circumferentially distributed threaded bores, some of said threaded bores being adapted to be aligned with the bores in said contact sections in a certain position of said longitudinal frame members and other threaded bores of the latter being adapted to be aligned with the bores in said contact sections when turning said longitudinal frame members about their longitudinal axes by a certain angle less than 180° relative to said first mentioned position, and threaded bolts adapted detachably to be passed through the bores of said transverse frame members into the threaded bores of said longitudinal frame members for detachably interconnecting said longitudinal and transverse frame members pertaining to each other.

4. A boom according to claim 3, in which adjacent ones of the bores in said longitudinal frame members are circumferentially spaced from each other a distance equalling at least the width of said roller means between said boom sections.

5. A boom according to claim 1, in which said transverse frame members have a triangular cross sectional contour with the corners thereof shaped in conformity with and embracing a substantial portion of the outer cross sectional contour of said longitudinal frame members.

6. A boom according to claim 1, in which said transverse frame members have a rectangular cross sectional contour with the corners thereof shaped in conformity with and embracing a substantial portion of the outer cross sectional contour of said longitudinal frame members.

7. A boom according to claim 1, in which said longitudinal frame members comprise pipes.

References Cited in the file of this patent
UNITED STATES PATENTS

| | | |
|---|---|---|
| 2,833,422 | Ferwerde et al. | May 6, 1958 |
| 2,942,700 | Parmenter et al. | June 28, 1960 |